No. 750,249. PATENTED JAN. 26, 1904.
H. BROOKES.
PROTECTIVE BAND FOR PNEUMATIC TIRES.
APPLICATION FILED AUG. 8, 1903.
NO MODEL. 2 SHEETS—SHEET 1.

No. 750,249. PATENTED JAN. 26, 1904.
H. BROOKES.
PROTECTIVE BAND FOR PNEUMATIC TIRES.
APPLICATION FILED AUG. 8, 1903.
NO MODEL. 2 SHEETS—SHEET 2.
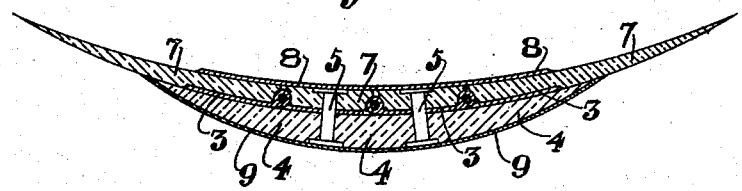
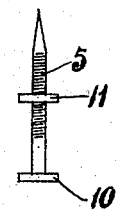
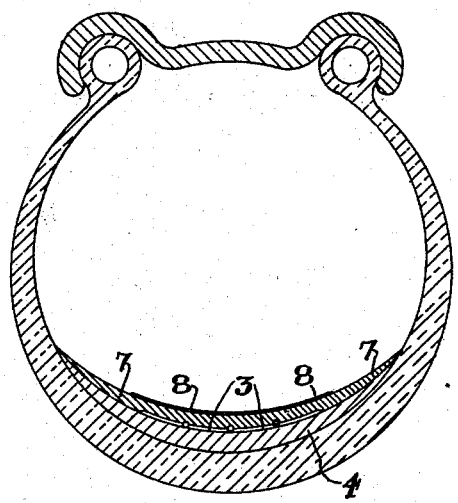
Witnesses
Thomas Nugent
T. Audley
Inventor
Harry Brookes
per Chas Coventry
Attorney.

No. 750,249. Patented January 26, 1904.

UNITED STATES PATENT OFFICE.

HARRY BROOKES, OF STIRCHLEY, NEAR BIRMINGHAM, ENGLAND.

PROTECTIVE BAND FOR PNEUMATIC TIRES.

SPECIFICATION forming part of Letters Patent No. 750,249, dated January 26, 1904.

Application filed August 8, 1903. Serial No. 168,838. (No model.)

*To all whom it may concern:*

Be it known that I, HARRY BROOKES, a subject of the King of Great Britain and Ireland, residing at York Buildings, High street, Stirchley, near Birmingham, in the county of Worcester, England, have invented a new and useful Improvement in Protective Bands for Pneumatic Tires, of which the following is a specification.

My invention has for its object a protective band for pneumatic tires to prevent puncture.

It consists of a series of hinge-like sections of metal or other suitable material which are independent and overlap endwise. They are held together by strips of rubber or other suitable elastic material, and they and said strips are fastened together by riveting or equivalent means. Strips of fabric, such as canvas, are thereafter solutioned on to cover the ends of the rivets, and thus prevent them from fraying the inner tube or outer cover.

My band is inserted between the outer cover and inner tube, and I have found by actual practice that it gives very good results.

Figure 1:
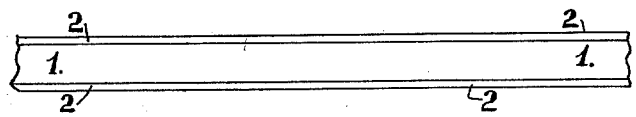
Figure 2:
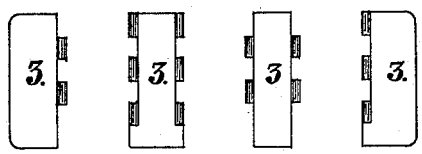
Figure 3:
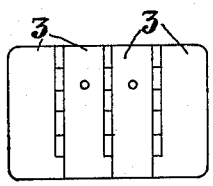
Figure 4:
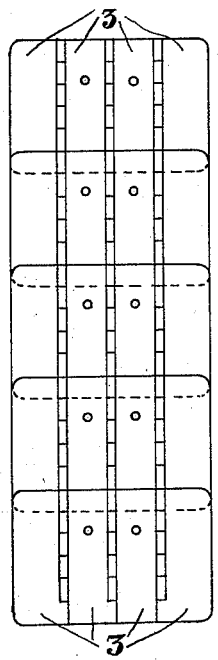

In the drawings, Figure 1 is a plan view of a strip of metal from which the pieces of the sections are composed by stamping or punching out. Fig. 2 shows the separate pieces. Fig. 3 shows one complete section. Fig. 4 shows a series of these sections assembled. It should be understood that each section is complete in itself and that they are assembled so as to overlap each other all round the tire. The pieces of each section are held together by wires after the manner of hinges. Fig. 5 is a transverse section through my puncture-preventing band ready for application to a pneumatic tire. Fig. 6 is a detail hereinafter described. Fig. 7 is a general section through a pneumatic tire having my invention applied thereto. The usual inner air-tube is omitted for the sake of clearness.

Referring first more particularly to Figs. 1 to 4, 1 is a strip of metal—brass, for instance—having beaded edges 2, which are preferably brazed down in place and from which the pieces 3 (shown in Fig. 2) are made. After these pieces are made they are fastened together with wire, as is usual in the manufacture of hinges, and complete sections, as shown in Fig. 3, result. A series of these separate sections are then assembled, as shown in Fig. 4, and they are retained in proper relative position by being fastened to a strip of rubber 4, (see Figs. 5 and 7,) being retained in place by rivets 5 or equivalent means. I use the term "rivet" throughout this specification, and while I prefer the form shown in Fig. 6, hereinafter described, I do not wish to confine my invention to that. The tops or inner circumferential portion of the sections are covered by strips of rubber 7 to prevent the inner tube being frayed by them, and the rivets 5 pass through these strips as well, as shown. The top strips of rubber 7 are so molded as to just protect the joints of the sections without putting much drag on them. 8 is a strip of canvas or other fabric solutioned on above to cover over the tops of the rivets, and 9 is a similar strip, which covers them below.

Referring now more particularly to Fig. 6, this shows the form of rivet I prefer to use to fasten the strips of rubber 4 and 7 together with the sections between them. It has a fixed head 10 and a screw-washer 11. The pointed end may be readily pierced through the rubber, and thereafter the screw-washers are applied and screwed tight down, so as to hold all firm. The pointed ends are then nipped off. It will be seen that while the sections are prevented from becoming entirely separated from each other they are yet capable of slight play one upon the other, because of the elasticity of the rubber strips 4 and 7, while at the same time being inclosed they do not damage the inner tube or outer cover of the tire.

Although I have described and shown four pieces 3 to each section, I do not confine myself to that precise number.

My invention is more especially intended for use on large tires, such as are used on motor-cars; but it may also be applied to cycle-tires.

What I do claim as my invention, and desire to secure by Letters Patent, is—

1. In a protective band for pneumatic tires the combination of hinged sections, rubber strips above and below them adapted to prevent them coming apart while allowing some relative movement, and rivets having screw-washers adapted to hold the separate parts together substantially as and for the purposes set forth.

2. In a protective band for pneumatic tires which comprises a series of overlapping sections, strips of rubber to cover them, and rivets to hold the pieces together, the combination therewith of strips of canvas to protect the ends of the rivets substantially as described.

In testimony whereof I have signed my name to this specification in the presence of two subscribing witnesses.

HARRY BROOKES.

Witnesses:
    JOHN BROOKES,
    ERNEST ALBERT SLATER.